A. ARCHAMBEAULT.
SHARPENER FOR LAWN MOWERS.
APPLICATION FILED MAR. 28, 1917.
1,238,620.
Patented Aug. 28, 1917.
2 SHEETS—SHEET 1.
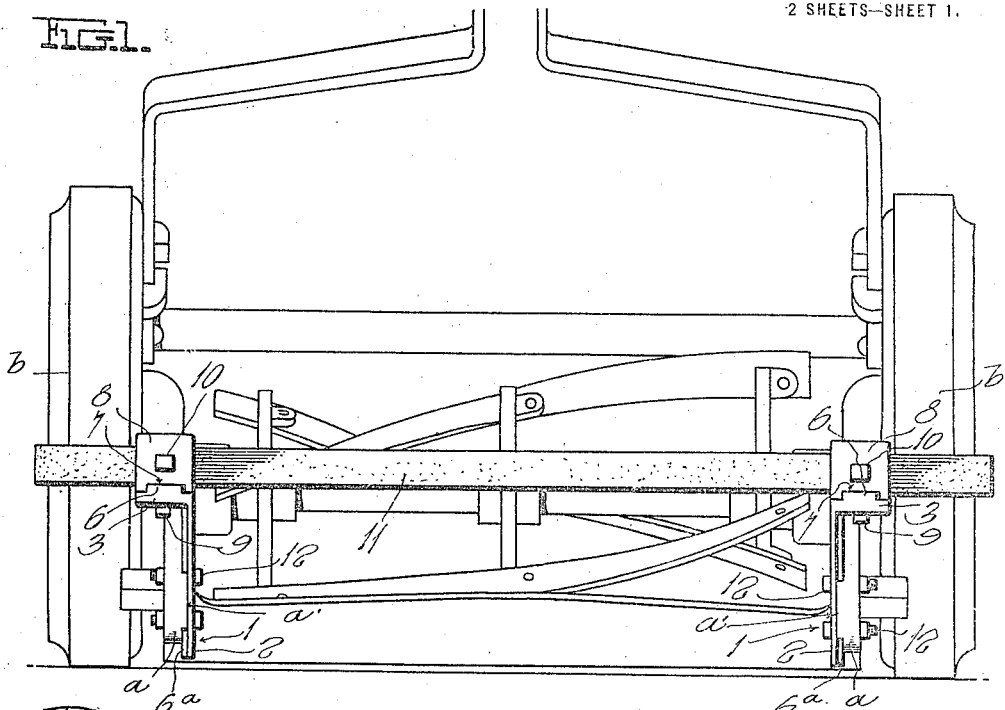
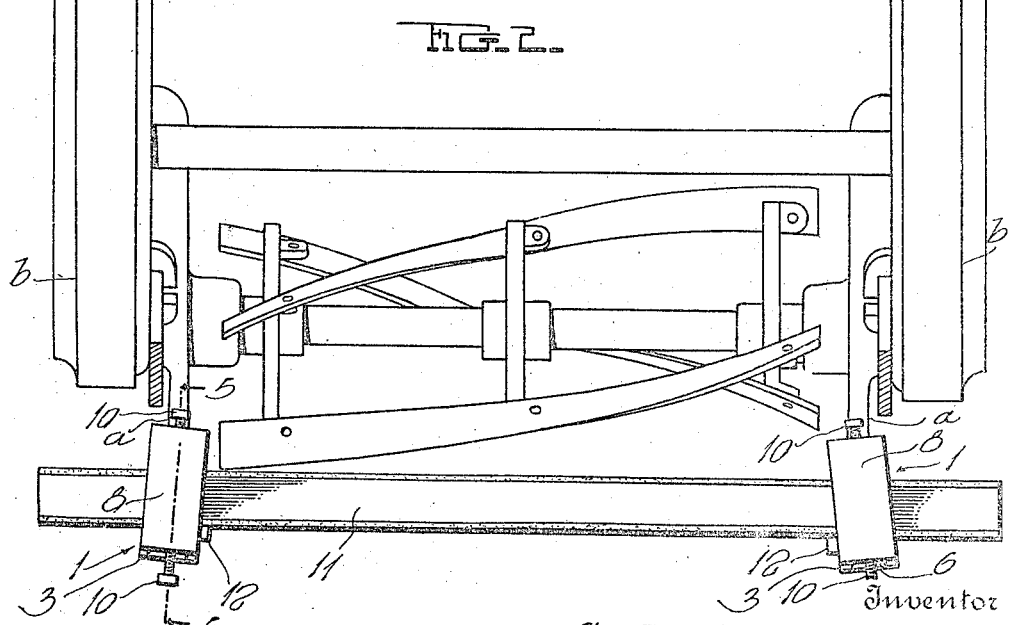
Witness
H. Woodard
Inventor
A. Archambeault
By H. A. Williams
Attorneys

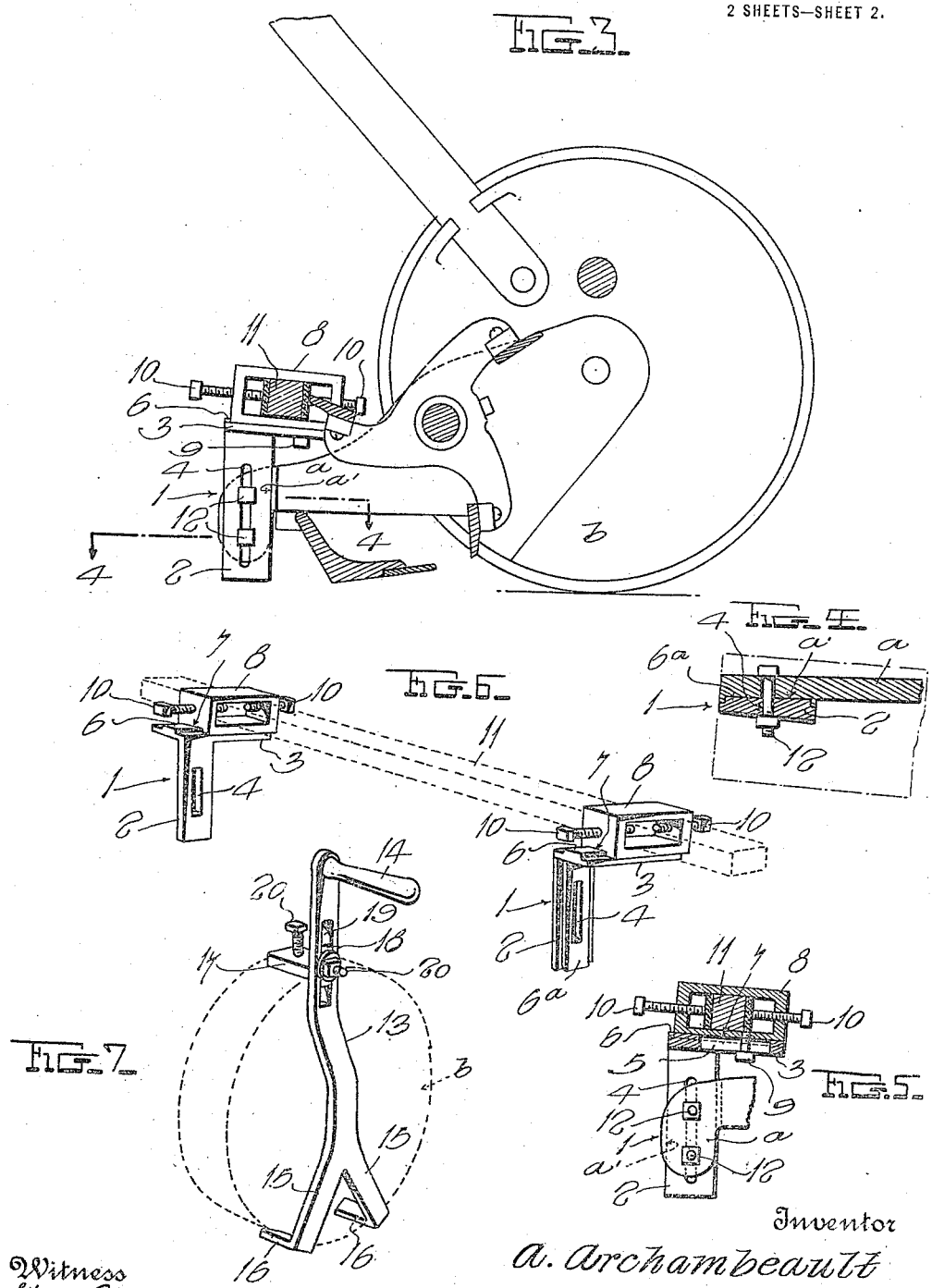

UNITED STATES PATENT OFFICE.

ARTHUR ARCHAMBEAULT, OF MANCHESTER, NEW HAMPSHIRE.

SHARPENER FOR LAWN-MOWERS.

1,238,620.     Specification of Letters Patent.     Patented Aug. 28, 1917.

Application filed March 28, 1917. Serial No. 158,048.

*To all whom it may concern:*

Be it known that I, ARTHUR ARCHAMBEAULT, a citizen of the United States, residing at Manchester, in the county of Hillsborough and State of New Hampshire, have invented certain new and useful Improvements in Sharpeners for Lawn-Mowers; and I do declare the following to be a full, clear, and exact description of the invention, such as will enable others skilled in the art to which it appertains to make and use the same.

This invention relates to sharpening devices especially adapted for use in connection with the ordinary lawn mowers.

One object of the invention is to provide a sharpening device which may be applied to the lawn mower without removing the cutting blades therefrom or without adapting the lawn mower especially for such application.

Another object of the invention is to provide a sharpening device of this character for lawn mowers whereby the sharpening force is created by either turning the ground wheels of the lawn mower when the latter is supported or held in substantially a stationary position, or by pushing the lawn mower over the ground or other surface in the same manner as is done when using it to cut or trim the grass.

Another object of the invention is to provide a sharpener of this character with adjustable means whereby the sharpening element may be moved toward or away from the knives of the lawn mower.

A further object of the invention is to greatly simplify sharpening devices of this character now known by the provision of a simple, cheap and durable construction, and one which will be efficient and reliable in operation, and well adapted to the purpose for which it is designed.

With these and other objects in view, the invention consists of certain details of construction, and the combination and arrangement of parts as will be hereinafter fully described and claimed.

In the accompanying drawings, forming a part of the application and in which similar reference characters are used to designate corresponding parts throughout the several views:—

Figure 1 is a rear elevation of the lawn mower equipped with the invention;

Fig. 2 is a top plan view thereof;

Fig. 3 is a longitudinal section of the mower and the grinding attachment thereon;

Fig. 4 is a detail horizontal section on substantially the plane of the line 4—4 of Fig. 3;

Fig. 5 is a detail vertical section on the plane indicated by the line 5—5 of Fig. 2;

Fig. 6 is a perspective view of the two brackets detached; and

Fig. 7 is a similar view of the crank employed for turning the mower wheels by hand.

Referring more particularly to the drawings, the numeral 1 designates as a whole a bracket consisting of a pair of arms 2 and 3, which are arranged at right angles to each other and have their flat sides disposed in planes positioned at right angles to each other. As shown, one end of the arm 2 is integrally united with one edge of the arm 3 near one end of the latter. Both of the arms 2 and 3 are provided with longitudinally extending slots 4 and 5 respectively, the slot 4 in the arm 2 being adapted to receive the clamping bolts to secure the bracket to the lawn mower. This will be more fully explained as the description of the invention proceeds.

The outer sides of the arms 3 and 2 respectively, are provided with longitudinally extending ribs 6 and 6$^a$, said rib 6 being fitted in a longitudinally extending channel 7 in one of the sides of a rectangular hollow block 8, the latter having a longitudinal sliding movement with respect to said arm 3. Extending through the slot 5 in the arm 3 is a clamping bolt 9, the inner end of which is threaded in the just referred to side of the block 8 to hold the latter in its adjusted position with respect to the arm 3.

Threaded in the ends of the block 8 are adjusting screws 10, the purpose of which will be hereinafter explained.

The complete sharpener is made up of a pair of brackets and blocks just specifically described, the blocks being identical in construction, while the brackets have their similar arms 3 extending in opposite directions.

The numeral 11 designates a sharpening or grinding element, which is here shown in the form of a comparatively long bar of emery, said bar being of rectangular configuration in cross section. It is to be here noted that the use of emery in constructing the bar 11 is not essential, as obviously any other suitable substance may be used. This bar 11 is inserted through the open blocks 8 and maintained in fixed relation to the same by means of the adjusting screws 10.

In applying the sharpener to the lawn mower, the usual ground roller at the rear end of the frame of the lawn mower is removed, and the arms 2 are clamped by the screws 12 to the brackets *a* which support this roller, the ribs 6ª being received between the vertical ribs *a'* of said brackets. The clamping bolts 9 are then loosened and the blocks 8 are adjusted so that the bar 11 can be moved into proper engagement with the knives of the lawn mower when the same are revolved. When this adjustment has been obtained, the bolts 9 are then again tightened.

The knives of the lawn mower may be revolved to effectively coact with the bar 11 either by pushing the lawn mower over the ground or floor in the same manner as when it is being used to cut the grass, or the ground wheels *b* may be revolved by hand after first throwing the ratchet thereof out of action. To facilitate the revolving of the wheels *b* when operated manually, a handle is used. This handle comprises a bar 13, to one end of which is fastened in any suitable manner a laterally extending hand hold 14, while the other end is forked and extending laterally from the furcations 15 of this end of the bar and in a direction opposite to that in which the member 14 extends, are fingers or lugs 16. These fingers or lugs 16 are adapted to engage the edge of one of the wheels *b* of the lawn mower, while the diametrically opposite edge of said wheel is engaged by an additional lug 17, the latter being carried by a block 18 sliding within the slot 19 in the body portion of the bar 13. After the lug 17 has been moved toward the lugs 16 into clamped engagement with the wheel *b*, a set screw 20 is tightened to lock said lug in its adjusted position. By operating the handle the wheel *b* of the lawn mower will be revolved and through the medium of the mechanism in the latter, the knives will be revolved against the bar 11, thus causing said knives to be evenly and effectively sharpened.

From the foregoing description it may be seen that the objects of the invention have been effectively carried out, as an extremely simple and cheap device has been provided.

The device is applicable to lawn mowers of numerous sizes and makes and may readily be applied thereto or removed therefrom.

As various minor changes in form, proportion, and in the other details of construction may be readily resorted to without departing from the spirit of this invention, it is to be understood that I do not wish to be limited to the construction herein shown and described other than as claimed.

I claim:—

A sharpener for lawn mowers comprising a pair of brackets consisting of a pair of right angularly arranged arms having their flat sides disposed in planes positioned at right angles to each other and being integrally united, one of the ends of one of the arms of said brackets being joined to one of the edges of the other arms thereof adjacent one of the ends of said other arms, said arms being provided with longitudinally extending central ribs on their outer sides and having longitudinally extending slots, the ribs on one of the arms of said brackets being adapted to fit between the spaced ribs formed on the brackets which usually support the roller at the rear end of the lawn mower and the slots in these arms being adapted to receive bolts to secure them to said lawn mower brackets, a pair of rectangular shaped hollow blocks having channels in one of their sides to receive the ribs on the other arms of said brackets to adapt said blocks to slide longitudinally with respect to these arms, bolts extending through the slots in the last mentioned arms of said brackets and having their ends threaded in the channeled sides of said blocks to maintain the latter in their adjusted positions, a bar having its ends received in said blocks and provided with a grinding surface on one side thereof, and adjusting screws threaded in the ends of said blocks and having their inner ends in engagement with the opposite sides of said bar to maintain the latter in said block.

In testimony whereof I have hereunto set my hand in the presence of two subscribing witnesses.

ARTHUR ARCHAMBEAULT.

Witnesses:
A. E. BOISVERT,
WILLIAM E. BOISVERT.

Copies of this patent may be obtained for five cents each, by addressing the "Commissioner of Patents, Washington, D. C."